United States Patent Office 2,707,484
Patented May 3, 1955

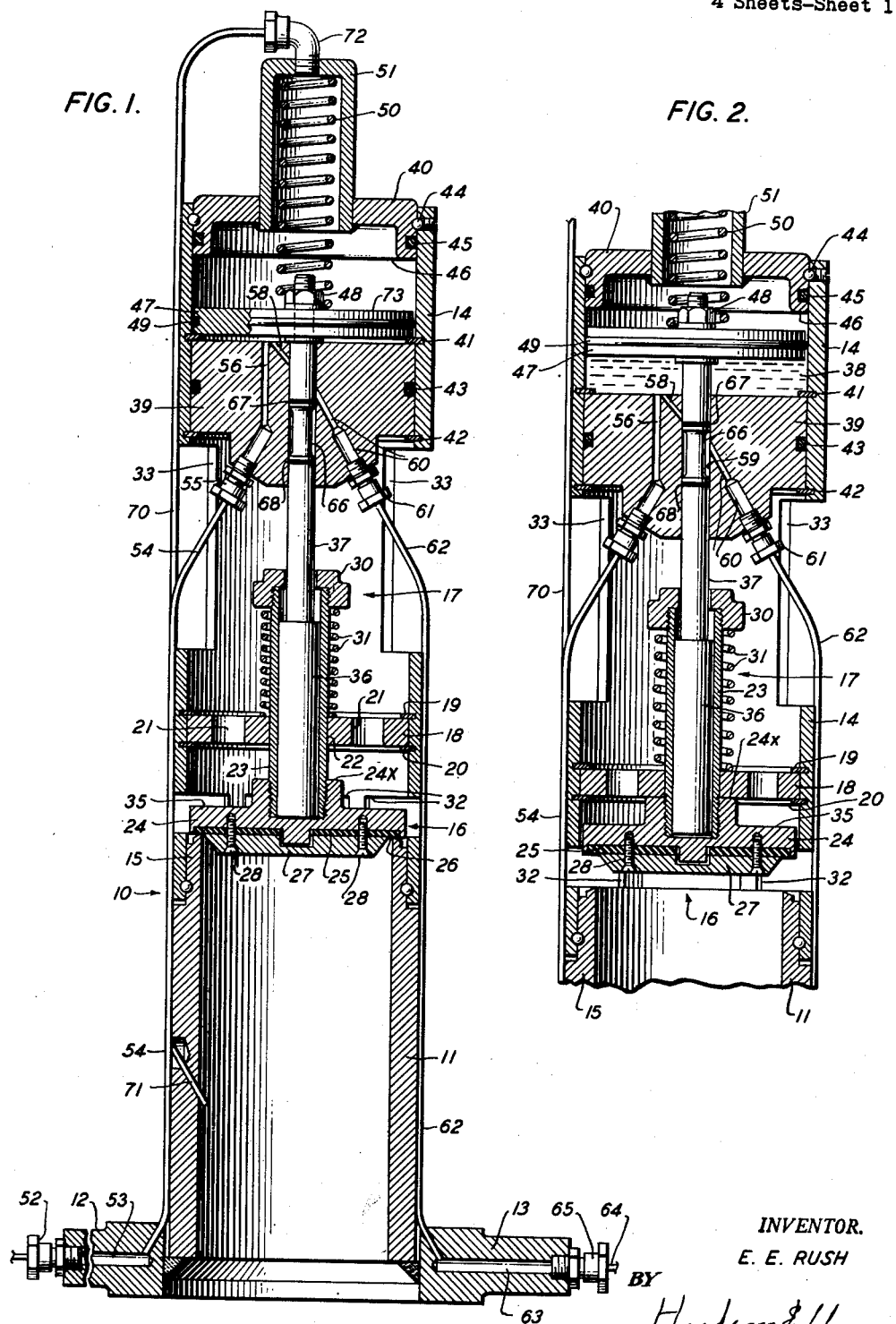

2,707,484
VALVES

Elton E. Rush, Bartlesville, Okla., assignor to Phillips Petroleum Company, a corporation of Delaware Application May 12, 1952, Serial No. 287,368

13 Claims. (Cl. 137—460)

This invention relates to valves. In one specific aspect, it relates to valve assemblies for removing volatile fluids, such as liquefied petroleum gas, from storage vessels.

In the handling of volatile fluids, particularly liquefied petroleum gas, many safety requirements must be met. For example, such materials must be stored in especially constructed tanks which are capable of withstanding the relatively high vapor pressures of these substances. When introducing material into the tank or removing it therefrom, it is necessary that the valve structures be provided with a number of different safety features.

The valve structure of this invention combines a number of the necessary safety features in a single unitary valve structure which is adapted for control by hydraulic fluid. The valve can be rapidly and positively opened or closed by proper regulation of the hydraulic fluid supply and, in the opened position, the structure has the additional function of performing as an excess flow valve, that is, a normally open valve which is closed when the amount of fluid flow therethrough becomes excessive. As an additional feature, the valve also incorporates a mechanism whereby, with the valve in closed position, there is a positive sealing action should the fluid pressure outside the tank become greater than the fluid pressure inside the tank to which the valve is attached. Finally, in one modification of the invention, I have provided a piston of novel design which reduces the amount of hydraulic fluid necessary to operate the valve.

It is an object of the invention to provide an improved valve which combines the functions of an ordinary valve, an excess flow valve, and a back flow valve.

It is a further object to provide a valve which can be operated by a minimum amount of hydraulic fluid.

It is a still further object to provide a valve which is simple in construction, reliable in operation, and economical to manufacture.

Various other objects, advantages, and features of the invention will become apparent from the following detailed description taken in conjunction with the accompanying drawings, in which:

Figure 1 is a vertical sectional view, partially in elevation, of a valve constructed in accordance with this invention, the valve being in closed position;

Figure 2 is a vertical sectional view of a portion of the valve of Figure 1 with the valve in open position;

Figure 3:
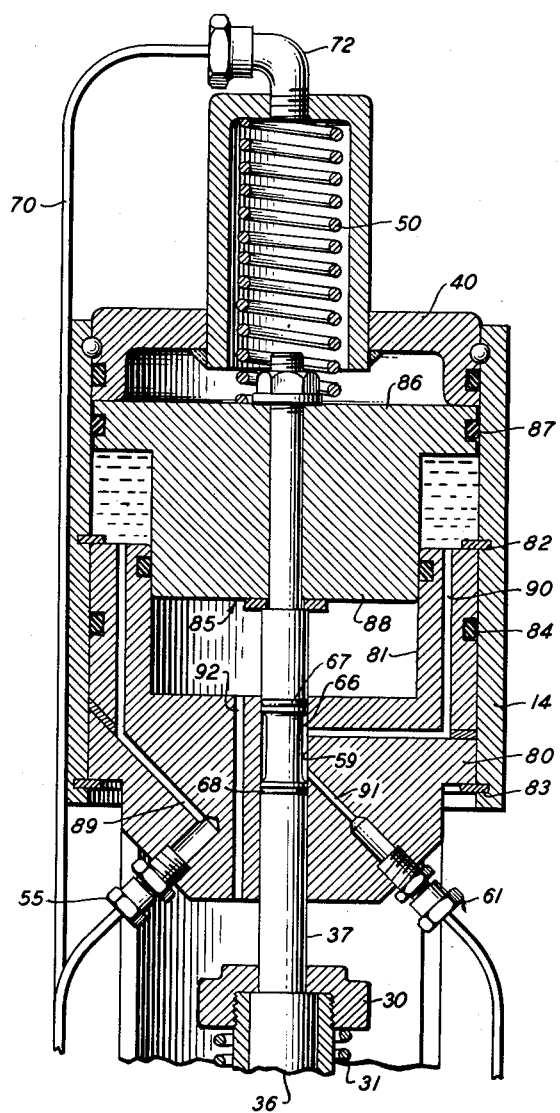
Figure 3 is a vertical sectional view, partially in elevation, of a modified piston chamber assembly.

Referring now to the drawings in detail, and particularly to Figures 1 and 2, the valve comprises a generally cylindrical casing 10, one end 11 of which is adapted to be attached to a conduit for withdrawing fluids, such as liquefied petroleum gas, from a storage vessel. To this end, the end portion 11 is provided with suitable fixtures, not shown, whereby the casing is attached to the storage vessel and it also has an inlet fitting 12 and an outlet fitting 13 for hydraulic lines to be hereinafter described in detail.

At its other end, the casing 10 is shaped to form a housing 14 enclosing a valve-actuating assembly, it being understood that the housing 14 is normally mounted inside the storage vessel containing the fluids to be dispensed.

The end portion 11, hereinafter termed the downstream end of the casing, is constructed and arranged to define a valve seat 15 with which cooperates a valve head 16 forming a part of a valve head assembly 17. This assembly includes a spider 18 secured between two mounting rings 19 and 20 which fit into complementary slots in the adjacent portion of the housing 14. The spider 18 has a number of circumferentially arranged openings 21 and an enlarged central opening 22 within which is slidably received a tubular valve stem 23. It will be evident that the stem 23 is mounted for longitudinal movement toward and away from the valve seat 15.

The valve head 16 includes a flanged disk 24 threaded to the adjacent end of the stem 23, and an annular resilient sealing gasket 25 mounted within the flanged portion of the disk, the gasket being engageable with a sharp ridge portion 26 formed upon the valve seat 15. The gasket 25 is held in position upon the disk 24 by a plate 27 secured to the disk 24 by bolts 28. At the end opposite valve head 16, the stem 23 carries an end cap 30, and a spring 31 is secured to and mounted between the end cap 30 and the central portion of spider 18. The strength or stiffness of spring 31 is such that the valve stem and valve head are normally positioned in the manner shown by Figure 2 with a flange or shoulder 24x on the valve head engaging the spider 21. In this position, fluid can flow from the interior of the storage vessel through a set of openings 32 in the housing 14, thereby creating a pressure drop between the interior of the tank and the downstream end 11 of the casing. The tank pressure is transmitted through a set of openings 33 into the interior of the housing 14 and, thence, to the upper surface 35 of the valve head. Should the rate of flow of the fluid become excessive, the tank pressure effective against the surface 35 will cause the valve head 16 to move into engagement with the seat 15 against the force exerted by the spring 31. Accordingly, when the position of the valve head is under the control of the spring 31, the assembly functions as an excess flow valve. It will be understood that the valve remains closed until it is opened by application of hydraulic pressure in the manner hereinafter described.

In accordance with the invention, the valve structure can also be moved to opened or closed position under the control of hydraulic fluid independently of the spring 31 and, combined with this feature, a positive sealing action of the valve in closed position is obtained should the pressure in the downstream end 11 of the casing become higher than the tank pressure. To this end, a plunger 36 is slidably mounted within the tubular stem 23 and this plunger, in turn, is secured to a piston rod 37 which extends axially to a piston chamber 38 defined by the housing 14, a metal insert 39 and an end cap 40 secured to the housing. Insert 39 is of generally cylindrical configuration and it is mounted between two rings 41 and 42 secured within suitable recesses in the housing, an annular sealing gasket 43 being provided at approximately the middle region of the insert. The end cap 40 is secured to the housing by a ball joint 44 and is provided with an annular sealing gasket 45 fitted within a flange 46.

As stated, the piston rod 37 extends into the chamber 38, and this rod carries a piston or disk 47 secured to a threaded upper portion of the piston rod by a nut 48. The piston is provided with an annular sealing gasket 49. The piston 47 is normally urged toward engagement with the ring 41 by a spring 50 secured to and extending between the piston and the end of a relatively small cylindrical housing 51 protruding from the end cap 40. The spring 50 is stronger than the spring 31 and, consequently, is able to force the piston downwardly. As a result, the plunger 36 engages the disk 24 of valve head 16 and forces it into engagement with the valve seat 15.

Structure is provided for admitting hydraulic fluid to the piston chamber between insert 39 and the piston 47, this structure including a fitting 52 in hydraulic inlet means 12, a bore 53, a hydraulic line 54, a fitting 55 and a bore 56 formed in the insert 39. Assuming that the pressure in the tank is greater than the pressure in the downstream part 11 of the casing, when the hydraulic fluid is admitted under pressure to the piston chamber, the piston is moved upwardly into engagement with the flange 46 of end cap 40, it being understood that the pressure of the hydraulic fluid is sufficient to overcome the force exerted by the spring 50. Such movement of the piston causes an upward movement of piston rod 37 and plunger 36, the plunger engaging the end cap 30 with the result that the valve stem and valve head are lifted a short distance away from the valve seat 15. Thereupon, spring 31 moves the valve head to the fully open position illustrated in Figure 2 with flange 24x in engagement with spider 18. If the pressure in casing section 11 is equal to or exceeds the tank pressure, the spring 31 and/or the pressure differential causes the valve head to remain in engagement with the lower end of the plunger 36 as the piston is raised.

With the piston in the last described position, however, the valve could not function as an excess flow valve since the plunger 36 would prevent the valve head from moving to a fully closed position, responsive to an excessive pressure differential on opposite sides of the valve head. Therefore, in accordance with the invention, a portion of the hydraulic fluid is bled from the piston chamber to permit downward movement of the plunger to a position where it will not prevent closure of the valve responsive to an excess flow condition.

To this end, leading from the piston chamber 38 is a bleed line 58 which communicates with a portion 59 of the piston rod bore, this portion of the bore also communicating with a bore 60 which is connected through a fitting 61 with a bleed pipe 62. This pipe, in turn, communicates with a bore 63 in the hydraulic fluid outlet means 13, the bore 63 being connected to a bleed line 64 by a fitting 65. At the region 59, the piston rod 37 is provided with an annular recessed portion 66 and a pair of annular sealing gaskets 67 and 68 are mounted above and below the recessed portion 66, respectively.

When the valve is in fully open position, the piston chamber 38 is in communication with bleed line 64 through bore 58, annular recessed portion 66, bore 60, pipe 62, bore 63 and fitting 65. As a result, hydraulic fluid bleeds from the piston chamber 38 at a relatively slow rate determined by the size of bore 58 until the resilient washer 67 is positioned just below the adjacent end of bore 58, as shown by Figure 2, at which time the passage of fluid through the bleed line is stopped. This bleeding of the fluid causes the piston rod and plunger 36 to move downwardly to a position where it will not interfere with the movement of the valve head to closed position responsive to an excess flow condition. In this position, the plunger 36 has no effect upon the position of the valve head, and the valve then functions as an excess flow valve. When it is desired to fully close the valve, the balance of the hydraulic fluid is drained from the piston chamber 38 through bore 56 and its associated control line. Thereupon, spring 50 moves the piston back to the position shown by Figure 1 with the result that the lower end of plunger 36 engages the valve head and forces it into engagement with the valve seat.

In accordance with the invention, I also provide means to automatically seal the valve in closed position in the event that the pressure in the downstream portion 11 of the casing becomes greater than the pressure in the fluid-containing vessel, that is, in the region above the valve head. To this end, communication is established between the downstream portion 11 and the portion of the piston chamber above the piston by a conduit 70 which leads from an inlet portion 71 at the downstream part of the casing to a fitting 72 communicating with the housing 51. Thus, the pressure in the downstream portion 11 is transmitted to the upper portion of the piston chamber where it acts upon the upper surface 73 of the piston 47. Inasmuch as the cross-sectional area of the piston is greater than that of the valve head 16, when the pressure in the downstream portion 11 is greater than the tank pressure, a force is developed resisting opening of the valve, the force becoming greater as the pressure in the downstream portion 11 increases. Accordingly, an excessive "back pressure" in the portion 11 cannot cause the valve to open.

It will be evident that the described valve structure achieves the objects and advantages of the invention. It will be noted that the valve is normally urged to the closed position by spring 50 and, when it is desired to open the valve, hydraulic fluid is admitted to the piston chamber through bore 56. As a result, the valve is opened, and the parts assume the position shown by Figure 2. When the supply of hydraulic fluid is cut off, a portion of the fluid in the piston chamber bleeds off through bore 58, annular recessed portion 66 and bore 60, thereby allowing the piston to drop gradually to an intermediate position at which the plunger 36 merely "floats" within the tubular stem 23 without affecting the operation of the valve. The valve structure then functions as an excess flow valve. When the balance of the hydraulic fluid is drained off, the piston moves downwardly to the position shown by Figure 1 under the influence of spring 50 with the result that the lower end of plunger 36 engages the valve head and moves it to closed position in engagement with the valve seat. Finally, should the pressure in the portion 11 of the casing become excessive with the valve in closed position, a sealing force is obtained due to the transmission of this pressure to the relatively large upper part of the piston through conduit 70. Accordingly, several features necessary to the proper operation of a valve controlling the eduction of liquefied petroleum gas from a storage vessel are combined in a simple unitary structure.

In Figure 3, I have shown a modified piston chamber structure, the use of which results in an economy of hydraulic operating fluid. The structure is generally similar to that of Figures 1 and 2 except for the structure of the piston and piston chamber. Accordingly, like parts are denoted by corresponding reference characters. In this modification, the piston chamber is defined by the housing 14, the end cap 40, and a generally cylindrical insert 80 having an enlarged central cylindrical recess 81, the insert being held within the housing by rings 82, 83 fitting into suitable recesses in the housing, and the insert being provided with an annular sealing gasket 84 intermediate the ends thereof.

The piston rod 37 carries a piston 85 having a disk-like end portion 86 extending to the walls of the piston chamber and provided with an annular sealing gasket 87. Below the disk-like portion 86 is an enlarged cylindrical portion 88 of substantially greater diameter than the piston rod which fits closely within the enlarged recess 81.

It will be noted that the piston chamber communicates with fitting 55 through a bore 89, and that a bleed passageway 90 leads from the piston chamber to the region 59 of the piston rod opening, the region 59 also communicating with the fitting 61 through a bore 91. Finally, the region defined by the opening 81 and the enlarged portion 88 of the piston communicates through a bore 92 with the interior of casing 14.

The operation of the valve is, in all respects, similar to that of Figures 1 and 2 except that considerably less hydraulic fluid is required to obtain a given movement of the piston with its attached piston rod and plunger assembly. This results from the fact that the volume of the piston chamber is effectively only the volume between the enlarged portion 88 and the walls of the housing 14, which is relatively small as compared with the volume between piston rod 37 and the walls of the housing 14 in Figure 2, for example. Consequently, this smaller volume requires a smaller amount of fluid to produce a given piston displacement. The bore 92 is provided so that any hydraulic fluid which may leak into the chamber defined by insert 81 and enlarged portion 88 will not accumulate there, but rather, will flow through the bore 92 to the storage vessel.

The valve of Figure 3 can be positively opened or closed in the manner described in connection with Figures 1 and 2 and, when the piston is in its intermediate position, the structure functions as an excess flow valve in the manner already described. Finally, the piston and the piston chamber structure of Figure 3 enable the valve operation to be carried out with a smaller quantity of hydraulic fluid.

In the modification of the valve shown by Figure 4, many of the parts are generally similar to those described in connection with Figures 1 and 2. Such parts will not be further described herein but will be indicated by like reference numerals followed by the letter "a."

In this modification, it will be noted that the piston 47a which is movable in the piston chamber 38a is secured to a modified stem 37a. The bleed port and corresponding bleed line 62a, instead of cooperating with an annular recess formed upon the plunger, communicate through a fitting and a bore 60a with an annular recess 60b formed in a block 60c mounted within and cooperating with the modified insert 39a, the block 60c being provided with sealing gaskets 60d, 60e cooperating with the piston rod 37a. Formed in the piston rod 37a is an axial passage 37b having two spaced radial ports 37c and 37d communicating therewith, the upper end of the passage being closed by a plug 37e. Instead of a plunger, the lower end of piston shaft 37a has an enlarged annular flanged portion 37f at the lower end thereof and an enlarged flanged portion 37g normally positioned at an intermediate region of the stem 23a.

In operation, assuming that the valve is in closed position, the valve head 16a is engaged with the valve seat 15a and, should the pressure below the valve seat be higher than the pressure within the tank, this pressure will be transmitted through line 70a to the interior of the housing 51 where it will act upon the upper surface of piston 47a. Since the cross sectional area of the piston is greater than that of the valve head, the pressure effective at the upper side of the piston will cause the valve to remain securely closed.

When it is desired to open the valve, hydraulic fluid is pumped into the piston chamber through line 54a and port 56a to cause the piston to move upwardly into engagement with upper snap ring 40b with the result that flanged portion 37g engages the end cap 30a and lifts the valve head away from the valve seat. As soon as the valve head is lifted a short distance off the seat, the spring 31a moves the stem 23a upwardly until flanged portion 27b of the valve head engages the spider 18a. Thereupon, fluid is discharged from the tank through the ports 33a. As a result, the pressure below the valve head becomes less than the tank pressure which is communicated to the upper surface of the valve head through the large openings 32a. Should the flow become excessive, the pressure differential between the top and bottom surfaces causes the valve to tend to close against the force of spring 31a so that, in open position, the valve acts as an excess flow valve. However, if the piston remains in its uppermost position, a closing action of the valve responsive to excess flow of fluid would be prevented by the engagement of end cap 30a with the flange 37g.

Figure 4:
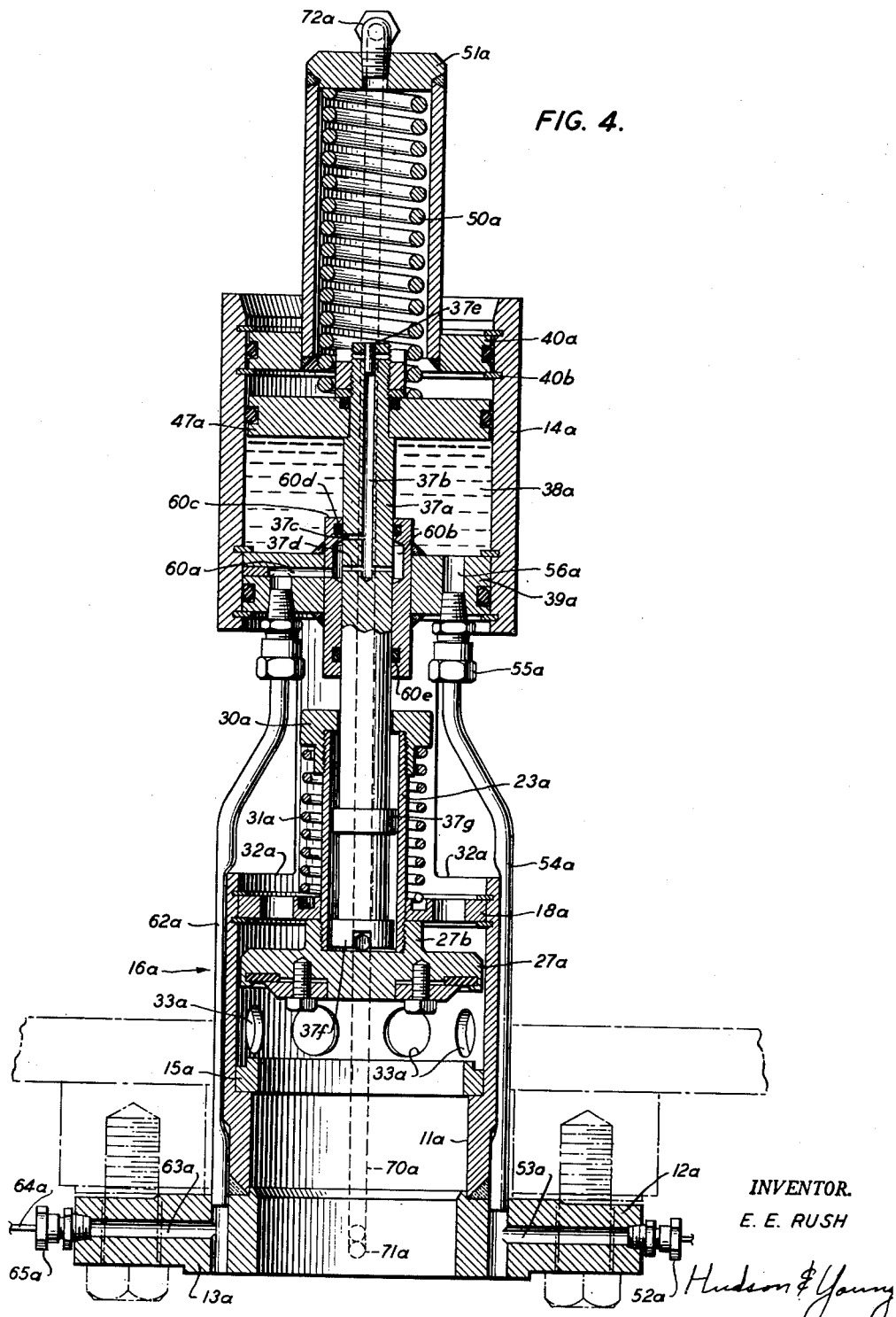
Figure 4 is a vertical sectional view, partially in elevation, of a modified valve structure constructed in accordance with the invention.

Accordingly, mechanism is also provided in Figure 4 to allow hydraulic fluid to bleed from the piston chamber until the valve plunger and piston move downwardly to a position where closing movement of the valve responsive to excess flow will not cause cap 30a to engage annular flange 37g. This bleeding action is effected by the passages 37c, 37d. When the piston is in its uppermost position, passage 37c is disposed above the block 60c and communicates with the piston chamber, the passage 37d communicating with bleed line 60a through annular port 60b. When the pumping of hydraulic fluid is stopped, fluid bleeds from the piston chamber through the described system of passages with resultant lowering of the piston and the valve plunger. Such bleeding and movement of the plunger continues until the passage 37c is positioned below the sealing ring 60d, at which time there is no longer any communication between the piston chamber and the bleed port 60a. When this condition occurs, the piston has moved downwardly a sufficient distance that the flange 37g will not prevent closing movement of the valve responsive to excess flow of fluid. When it is desired to fully close the valve, the remainder of the hydraulic fluid is removed from the piston chamber through line 54a with the result that spring 50a moves the piston rod 37a downwardly, thereby causing annular flange 37f to engage the valve head and move it downwardly to closed position.

Accordingly, the modified valve construction of Figure 4 has all the advantages of the structure of Figures 1 and 2 in that the valve can be readily moved to open position by pumping hydraulic fluid into the piston chamber. When the valve is open, the valve head functions as an excess flow device due to the action of spring 31a and, when the valve is closed, an excessive pressure below the valve head causes the valve to become more tightly closed instead of being moved toward open position due to the transmission of pressure through the line 70a to the upper surface of piston 47a. In addition, the particular bleed port arrangement illustrated in Figure 4 has been found highly advantageous in certain applications of the valve, as the valve porting is substantially simplified and the construction and assembly of the valve are facilitated, and the structure of the stem is strengthened. The provision of the flanged portions 37f, 37g reduces the metal to metal contact surface between the plunger and stem 23a with resultant reduction in friction. The plunger can fit loosely in the stem and cap 30a with the result that dirt, scale, and the like can be washed downward through an opening in the stem adjacent flanged portion 37f. A tool can be inserted in this opening to hold the plunger assembly rigid during assembly of the valve.

Figure 5:
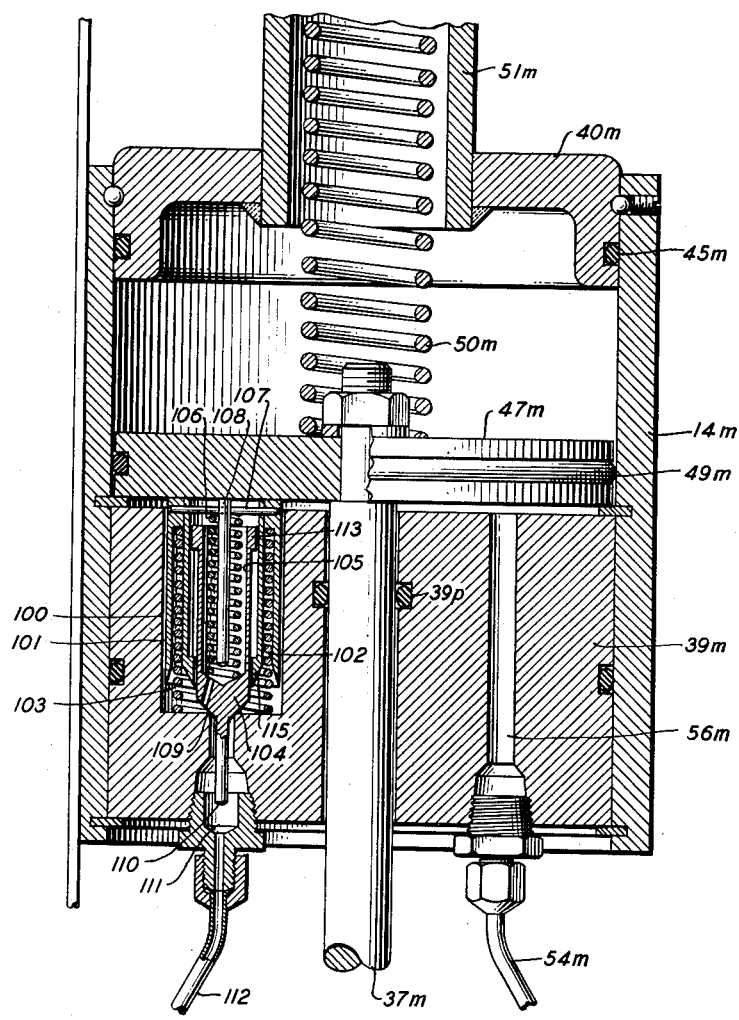
Figure 5 is a view illustrating a modified type of bleed mechanism.

In Figure 5, I have shown a modified device for controlling bleeding of the fluid from the piston chamber without the use of ports associated with the valve stem. In this figure, I have shown only the piston chamber assembly, and it will be understood that the remainder of the valve can be constructed as shown in Figures 1 and 2 or as shown by Figure 4. The structure includes a housing 14m, an end cap 40m, a housing 51m, valve closing spring 50m, piston rod 37m, and piston 47m, the end cap 40m being provided with a sealing ring 45m and the piston being provided with a sealing ring 49m. The structure further includes a block or insert 39m having a sealing ring 39p cooperating with the piston rod 37m, this insert being provided with a bore 56m for admitting hydraulic fluid to the piston chamber from a line or conduit 54m.

The insert 39m is shaped to form a cylindrical recess 100 within which is slidably mounted a cylindrical member 101 having a slot 102 formed therein to receive a spring 103. This spring urges the member 101 upwardly so that it always engages the piston 47m. Mounted concentrically within the member 101 is a second cylindrical member 104 of reduced diameter. Member 104 has a central opening 105 within which is mounted a spring 106, this spring extending between the lower part of the cylindrical member and a pin 107 secured to the upper part of the cylindrical member 101. The pin 107 also carries a rod 108 which extends downwardly and axially into the opening 105 as a guide. Spring 106 urges the member 104 into engagement with a valve seat 109 formed at the lower part of the cylindrical recess 100, and the lower part of the member 104 carries a downwardly protruding rod 110 which extends axially of the bore 111 formed in the block or insert 39m, this bore communicating with a bleed conduit 112. An annular flange 113 is formed at the upper part of member 104 and a cooperating annular flange 115 is formed at the lower end of member 101.

In operation, when the piston moves upwardly responsive to the pumping of hydraulic fluid through line 54m, the valve defined by parts 104, 109 remains closed until member 115 engages member 113 and lifts the cylindrical member 104 away from valve seat 109. Thereupon, hydraulic fluid begins to bleed from the piston chamber through the line 112. When the pumping of hydraulic fluid is stopped, the bleeding of fluid continues until the piston moves downwardly to a position where member 115 releases member 113, thereby allowing cylindrical member 104 to move into engagement with the valve seat 109. Thereupon, the bleeding of fluid is stopped and the piston remains in an intermediate position within the chamber until it is again moved to closed position by removing hydraulic fluid through line 56m. When the valve embodies the structure shown by Figure 5, it will be evident that the valve head and valve seat of the main valve structure operate in the manner already described, the bleeding action being obtained by the action of the parts 100 to 115, inclusive, rather than by the use of ports controlled by the piston rod.

While the invention has been described in connection with present, preferred embodiments thereof, it is to be understood that this description is illustrative only and is not intended to limit the invention.

I claim:

1. A valve comprising, in combination, a body having a casing adapted for mounting in a container, and a housing adapted for communication with an outlet line communicating with said container, said housing being shaped to form a valve seat at one end thereof, a support secured to said casing, a valve head assembly mounted in said support for movement toward and away from said valve seat, a spring operatively connected to said support and said head assembly to cause the valve head to assume a position spaced from said valve seat, the strength of the spring being adjusted so that an excess flow of fluid from the casing to the housing causes the valve head to move into engagement with the valve seat against the force of said spring, means independent of said spring for moving said valve head to a position spaced from said seat, a pressure-receiving member operatively connected to said valve head assembly, the cross-sectional area of said member being greater than the cross-sectional area of said valve head, and means communicating the pressure in said housing to said member whereby, when the housing pressure becomes excessive, a force is developed urging the valve head against the valve seat.

2. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger slidably mounted within said valve stem, means for moving said plunger away from said valve seat to lift the valve head out of engagement with said seat, means for moving said plunger toward said valve seat to cause engagement of said valve head and said seat, and means for causing said plunger to assume an intermediate position wherein the movement of the valve head is unaffected by the position of said plunger.

3. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger slidably mounted within said stem, means for moving said plunger away from said valve seat to lift the valve head therefrom, means for causing said plunger to assume an intermediate position wherein the position of the valve head is unaffected by the position of said plunger, a pressure-receiving member secured to said plunger and movable in said casing, the cross-sectional area of said member being greater than the cross-sectional area of said valve head, and a conduit connecting a portion of said casing downstream of said valve seat with a portion of said casing upstream of said pressure-receiving member.

4. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger slidably mounted in said valve stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, and means for bleeding hydraulic fluid from said piston chamber to permit said piston and said plunger to assume an intermediate position wherein the position of the valve head is controlled by said spring and is independent of the position of said plunger.

5. A valve constructed in accordance with claim 4 in which the bleeding means is controlled by a second valve head urged into engagement with a second valve seat, a member movable with said piston to lift said second valve head away from said second valve seat when the piston reaches a predetermined position, said member releasing said second valve head to engage said second valve seat upon a return movement of said piston to said predetermined position.

6. A valve constructed in accordance with claim 4 in which said bleeding means includes a second valve head cooperating with a second valve seat, said seat communicating with the piston chamber, means for urging said second valve head into engagement with said second valve seat, a control member, means for urging said control member into engagement with said piston so that it moves therewith, said member being constructed and arranged to lift said valve head away from said second valve seat upon movement of said piston to a predetermined position and to release said valve head upon a return movement of said piston past said predetermined position.

7. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger slidably mounted within said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, and means including a pair of communicating ports in said plunger for bleeding hydraulic fluid from said piston chamber to permit said piston and said plunger to assume an intermediate position wherein the position of the valve head is controlled by said spring and is independent of the position of said plunger, one of said ports communicating with said piston chamber when the piston is moved to lift the valve head away from its seat, and said one port moving out of communication with the piston chamber when the plunger assumes said intermediate position, said other port communicating with a bleed line.

8. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position fluid pressure created by an excess flow of fluid from the housing toward said one end of the casing is adapted to force said valve head into engagement with said valve seat against the force of said spring, a plunger movable axially within said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, a pair of spaced sealing gaskets secured to said piston rod at a region between the piston chamber and the valve plunger, the rod being shaped to form an annular recessed portion between said gaskets, a bore formed within said casing connecting said piston chamber with the region between said gaskets when the piston is in valve-opening position, a bleed line communicating with said region when the piston is in said valve-opening position whereby fluid is bled from the piston chamber with consequent movement of the piston and valve plunger toward the valve seat as long as said bleed line communicates with said bore through said annular recess, the length and position of the recess being such that such movement continues until the plunger assumes an intermediate position at which the position of the valve stem is controlled by said spring and is independent of the position of said plunger.

9. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position fluid pressure created by an excess flow of fluid from the housing toward said one end of the casing is adapted to force said valve head into engagement with said valve seat against the force of said spring, a plunger mounted for axial movement within said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, a sealing gasket secured to said piston rod, a pair of communicating ports formed in the piston rod below said sealing gasket, one of said ports continuously communicating with said bleed line, the other port communicating with said piston chamber when the piston is moved to a position wherein the valve head is lifted off the valve seat, said other port communicating with said bleed line when the plunger assumes an intermediate position at which the position of the valve stem is controlled by said spring and is independent of the position of said plunger.

10. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger movable axially in said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, means for bleeding hydraulic fluid from said chamber to cause said plunger to assume an intermediate position wherein the position of the valve stem is independent of the position of the plunger, a spring connected to said casing and said piston to force said piston and said plunger toward said valve seat, and a conduit connecting a portion of the casing downstream of the valve seat with a portion of the casing upstream of said piston, the cross-sectional area of said piston being greater than the cross-sectional area of said valve head.

11. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger movable axially within said stem, a piston rod secured to said plunger and extending longitudinally of said casing, a piston member secured to said rod and movable in a piston chamber defined by said casing, said piston member including an end portion extending from said rod to the walls of the piston chamber, and an enlarged flange of substantially greater diameter than said piston rod, said flange extending throughout the length of the piston chamber, a line for admitting hydraulic fluid to said piston chamber to cause said piston and plunger to move away from said valve seat and thereby lift the valve head away from the seat, and means for bleeding hydraulic fluid from said chamber to cause said plunger to assume an intermediate position wherein the position of the valve stem is independent of the position of the plunger.

12. A valve comprising, in combination, an elongated metal casing, one end of said casing being constructed and arranged to define a valve seat, the other end of said casing defining a housing for a valve head assembly, a valve head assembly including a tubular stem mounted for axial movement in said casing toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger slidably mounted within said valve stem, means for moving said plunger away from said valve seat to lift the valve head out of engagement with said seat, means for moving said plunger toward said valve seat to cause engagement of said valve head and said seat, and means for causing said plunger to assume an intermediate position wherein the movement of the valve head is unaffected by the position of said plunger.

13. A valve comprising, in combination, an elongated metal casing, one end of said casing being constructed and arranged to define a valve seat, the other end of said casing defining a housing for a valve head assembly, a valve head assembly including a tubular stem mounted for axial movement in said casing toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger slidably mounted in said valve stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, and means for bleeding hydraulic fluid from said piston chamber to permit said piston and said plunger to assume an intermediate position wherein the position of the valve head is controlled by said spring and is independent of the position of said plunger.

References Cited in the file of this patent

UNITED STATES PATENTS

| | | |
|---|---|---|
| 1,153,850 | Meier | Sept. 14, 1915 |
| 1,167,287 | Ford | Jan. 4, 1916 |
| 1,395,586 | Kirchbaum | Nov. 1, 1921 |
| 1,770,912 | Clapp | July 22, 1930 |
| 2,418,743 | Baker | Apr. 8, 1947 |
| 2,543,566 | Brown | Feb. 27, 1951 |